「 
US007878220B2

(12) United States Patent
Fierst et al.

(10) Patent No.: US 7,878,220 B2
(45) Date of Patent: Feb. 1, 2011

(54) PIPE PLUG WITH A LOCATING APPLIANCE

(76) Inventors: Raymond V. Fierst, 4603 Harris Rd., Broadview Heights, OH (US) 44141; Richard M. Fierst, 4589 Alger Rd., Richfield, OH (US) 44286

( * ) Notice: Subject to any disclaimer, the term of this patent is extended or adjusted under 35 U.S.C. 154(b) by 3 days.

(21) Appl. No.: 12/467,768

(22) Filed: May 18, 2009

(65) Prior Publication Data

US 2010/0037969 A1 Feb. 18, 2010

Related U.S. Application Data

(63) Continuation-in-part of application No. 11/465,423, filed on Aug. 17, 2006, now abandoned.

(60) Provisional application No. 61/053,803, filed on May 16, 2008, provisional application No. 60/708,891, filed on Aug. 17, 2005.

(51) Int. Cl.
    *F16L 55/10* (2006.01)
(52) U.S. Cl. .................. 138/89; 138/104; 220/230; 220/235
(58) Field of Classification Search ................ 138/89, 138/104; 220/230, 235; 335/305; 206/818
    See application file for complete search history.

(56) References Cited

U.S. PATENT DOCUMENTS

| 4,493,344 | A | * | 1/1985 | Mathison et al. | ............... 138/89 |
|---|---|---|---|---|---|
| 4,506,705 | A | * | 3/1985 | Thompson | .................... 138/89 |
| 4,768,560 | A | * | 9/1988 | Logsdon | ....................... 138/90 |
| 5,038,829 | A | * | 8/1991 | Panella | ......................... 138/89 |
| 6,250,337 | B1 | * | 6/2001 | Bevacco | ....................... 138/89 |
| 6,807,987 | B2 | * | 10/2004 | Hill et al. | .................... 138/104 |
| 7,278,450 | B1 | * | 10/2007 | Condon | ........................ 138/89 |
| 2008/0314468 | A1 | * | 12/2008 | Houghton | ..................... 138/89 |

OTHER PUBLICATIONS

John J. Garner—County of Cuyahoga: "Rules and Regulations Governing the Installation of Water and Sewerage Improvement" (Effec. Oct. 1, 1985); p. 8 and Drawing.

* cited by examiner

*Primary Examiner*—Patrick F Brinson
(74) *Attorney, Agent, or Firm*—Tucker Ellis & West LLP

(57) ABSTRACT

A pipe plug provides a water-tight seal and expedites locating of non-metallic pipes. The pipe plug includes a hollow body member adapted for being received by an associated piping member of a variety of inner dimensions, and for being engaged with it. The hollow body member includes a tapered portion with tapered threads on its exterior surface and a seal member made of a resilient material. The seal member envelopes the tapered portion of the body and is capable of moving along the exterior surface of the body in a direction generally orthogonal to the direction of the threads, providing thereupon a leak-safe seal. The body is provided with and engaged with a cap portion that includes a metal plate on its top surface, thus adapted for being located with a metal detector.

11 Claims, 3 Drawing Sheets

PIPE PLUG WITH A LOCATING APPLIANCE

CROSS REFERENCE TO RELATED APPLICATIONS

This application claims the benefit of U.S. Provisional Application Ser. No. 61/053,803 filed on May 16, 2008 and this application is also a Continuation-in-Part of application Ser. No. 11/465,423 filed on Aug. 17, 2006, now abandoned which claimed the benefit of U.S. Provisional Application Ser. No. 60/708,891 filed on Aug. 17, 2005.

BACKGROUND OF THE INVENTION

The subject application is directed to an end fitting for a piping system that provides a pipe plug for use in various plumbing and piping pressurized and non-pressure applications, such as plumbing industry, piping repair, replacement, sanitary and storm systems for yard cleanouts, and the like. In particular, the subject application is directed to a pipe plug that is capable of being used with piping members having a range of inner diameters. More particularly, the subject application is directed to a pipe plug that is capable of being located by a metal detector.

As known in the art, the American National Standards Institute assigns schedule numbers to classify wall thicknesses for pipes of different pressure applications. Examples of commonly used schedule numbers (SCH) are SCH 28, SCH 35, SCH 38, and SCH 40. Inner diameters of pipes used in various plumbing and piping pressurized and non-pressure applications typically range from ½" to 6". Current techniques for piping end fittings typically involve the use of pipe plugs with dimensions such as to mate with the dimensions of a specific pipe section.

A variety of pipe and tubing materials including several types of plastic, copper, steel, iron, aluminum, clay, and the like, is typically used in piping systems in indoor/outdoor applications. However, when used in external applications, the non-metallic pipes are either buried, or gradually sink into the ground without routine maintenance. Once the piping gets covered by earth or various waste materials, it is difficult to determine the exact location when problems occur. For example, when a non-metallic pipe ruptures under concrete or other aggregate, frequently the only way to determine the location is to begin digging where fluid is visible. This may result in a large undertaking to ascertain the location. In many cases, large tracts of sod, dirt, and plants must be moved to determine where the non-metallic pipe, such as a sewer pipe, is located.

SUMMARY OF INVENTION

In accordance with the subject application, there is provided a pipe plug for a piping system that provides a pipe plug for use in various plumbing and piping pressurized and non-pressure applications, specifically, outdoor piping systems. There is further provided a pipe plug for a piping system that allows for easy access to non-metallic outdoor piping systems, such as drain, waste, vent, sanitary and storm systems for yard cleanouts, sewer pipes, and the like.

Further, in accordance with the subject application, there is provided a pipe plug for use with piping members having a variety of schedule numbers.

Still further, in accordance with the subject application, there is provided a pipe plug for use with piping members having a variety of inner diameters.

Yet further, in accordance with the subject application, there is provided a pipe plug capable of being located by a metallic detector.

Further, in accordance with one embodiment of the subject application, there is provided a pipe plug that includes a hollow main body member adapted for being received by an associated piping member. The hollow main body member includes a cylindrical portion and a tapered portion rigidly attached to one end of the cylindrical portion. The pipe plug further includes an end cap portion engaged with an end of the cylindrical portion of the hollow body opposite from the tapered portion. The end cap portion overlaps, at least partially, the cylindrical portion of the hollow body. That is, an edge of the end cap portion extends radially outwardly beyond the extent of the cylindrical portion thereby forming a circular lip around the top of the pipe plug. The exterior surface of the tapered portion of the hollow body is provided with tapered threads. The tapered threads are adapted to be engaged with a corresponding portion of an inside surface of an associated piping member. The pipe plug further includes a seal member. The seal member is shaped as a hollow cylinder and is, preferably, made of a resilient material, such as a synthetic rubber, rubber-like plastics, natural rubber, and the like. The seal member envelopes a corresponding part of the tapered portion of the hollow body.

In a preferred embodiment, the seal member is adapted to slide along the exterior surface of the tapered portion in a direction generally orthogonal to the direction of the threads. The latter allows for using the pipe plug of the subject application with piping members of a variety of inner diameters. The interior surface of the seal member is, preferably, lubricated to allow for sliding of the seal member along the exterior surface of the tapered portion of the hollow body. The seal member is capable of expanding and contracting responsive to pressure subjected thereupon by the hollow body of the pipe plug such as to conform to the inner dimensions of a corresponding piping member.

In accordance with another embodiment of the subject application, the end cap portion of the pipe plug includes a locating appliance, adapted for being located by a metal detector. The locating appliance is, preferably, made as at least one metal portion, such as, at least one metal plate member. The at least one metal plate member is capable of being fixedly attached to an exterior surface of the end cap portion, such as molded to the exterior surface of the end cap portion. Alternatively, the at least one metal plate member is capable of being embedded into the top surface of the end cap portion. The at least one metal plate is, preferably, of a disk shape. The at least one metal plate member may include a suitable protective coating.

In accordance with another embodiment of the subject application, the end cap portion of the pipe plug includes a slot adapted for receiving a corresponding tightening appliance, such as a channel lock or crescent wrench, to provide engaging of the pipe plug with a corresponding pipe member.

In accordance with another embodiment of the subject application, the end cap portion of the pipe plug includes a solid cylindrical portion and a disk portion, which are rigidly attached to each other. The disk potion of the end cap portion overlaps the solid cylindrical portion. The solid cylindrical portion is adapted to be engaged with the interior of the cylindrical portion of the hollow body of the pipe plug. Thus, the relationship of the dimensions of the solid cylindrical portion of the end cap portion and of the inner diameter of the cylindrical portion of the hollow body of the pipe plug are such, as to allow for engaging the solid cylindrical portion of the end cap portion with the interior surface of the cylindrical portion of the hollow body of the pipe plug.

Still other advantages, aspects and features of the subject application will become readily apparent to those skilled in the art from the following description wherein there are shown and described preferred embodiments of the subject application, simply by way of illustration of the best modes best suited for carrying out the invention. As it will be realized, the subject application is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

The subject application is directed to a pipe plug for a piping system that provides a pipe plug for use in various plumbing and piping pressurized and non-pressure applications, such as plumbing industry, piping repair, replacement, sanitary and storm systems for yard cleanouts, and the like. In particular, the subject application is directed to a pipe plug that is capable of being used with piping members of multiple inner diameters. More particularly, the subject application is directed to a pipe plug that is capable of being located by a metal detector. Those skilled in the art will appreciate that the subject application is not limited to the use of any single dimension piping member. As will be known in the art, suitable pipe dimensions include, but are not limited to, SCH 28, SCH 35, SCH 38, and SCH 40, and the like. Those skilled in the art will further recognize that the subject application is not limited to be used with piping members of any single material. As will be known in the art, suitable materials include, but are not limited to aluminum, brass, bronze, carbon or graphite, ceramic or ceramic lined, clay or vitrified clay, concrete, polyvinyl chloride (PVC), thermoplastic resin, such as acrylonitrile-butadiene-styrene (ABS), and the like.

Figure 1A:
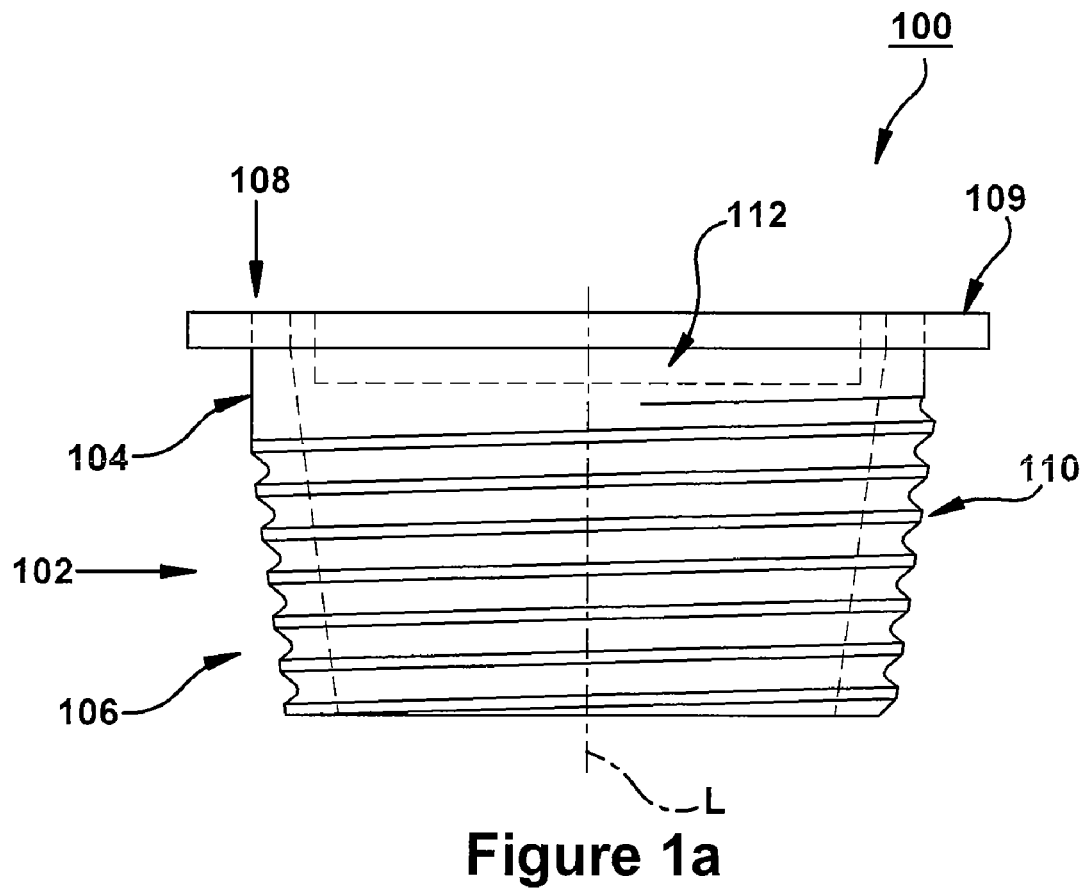
FIG. 1a illustrates a side view of a pipe plug in accordance with one embodiment of the subject application.

Referring now to FIG. 1a, there is shown a side view of a pipe plug 100 in accordance with one embodiment of the subject application. The pipe plug 100 includes a hollow main body member 102 adapted for being received by an associated piping member (not shown in FIG. 1). The hollow body member 102 includes a cylindrical portion 104 and a tapered portion 106 rigidly attached to one end of the cylindrical portion 104. The cylindrical portion 104 and the tapered portion 106 extend along a mutual co-linear longitudinal axis L as shown. As will be recognized by those skilled in the art, the hollow body member 102 is capable of being fabricated as a single tube including the cylindrical portion 104 and the tapered portion 106. The pipe plug 100 further includes an end cap portion 108 engaged with the other end of the cylindrical portion 104 of the hollow body member 102, so as to prevent unwanted material, such as debris, from entering hollow body member 102 and hence, from entering an associated piping member. As will be further appreciated by a skilled artisan, the hollow body member 102 is capable of being fabricated as a single tube including the cylindrical portion 104, the tapered portion 106, and the end cap portion.

The end cap portion 108 overlaps, at least partially, the cylindrical portion 104 of the hollow body member 102. To that end, as shown, an edge of the end cap portion 108 extends radially outwardly beyond the extent of the cylindrical portion 104 thereby forming an outer circular lip 109. The lip 109 is useful in preventing the pipe plug 100 from falling into the opening of an associated pipe during servicing thereof. The lip also provides structural strength and integrity to the plug. The exterior surface of the tapered portion 106 of the hollow body member 102 is provided with tapered threads 110. The tapered threads 110 are adapted to be engaged with a corresponding portion of an inside surface of an associated piping member (not shown in the drawing). As illustrated in FIG. 1a, the end cap portion 108 of the pipe plug 100 further includes a slot 112. The slot 112 is adapted for receiving a corresponding tightening appliance, such as a channel lock or crescent wrench, to provide engaging of the pipe plug with a corresponding pipe member (not shown in the drawing).

Figure 1B:
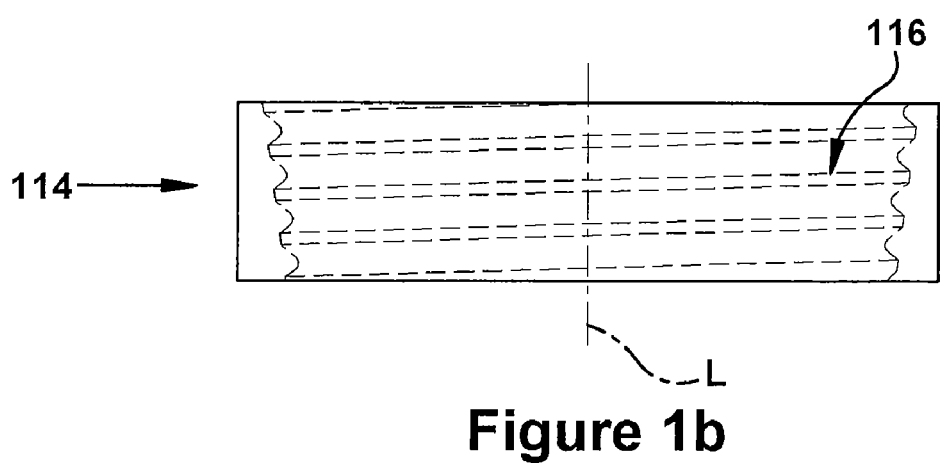
FIG. 1b illustrates a side view of a seal member in accordance with one embodiment of the subject application.

The pipe plug 100 further includes a seal member 114 shown in FIG. 1b. The seal member 114 is shaped as a hollow cylinder and is, preferably, made of a resilient material, such as a synthetic rubber, rubber-like plastics, natural rubber, and the like. Other suitable materials are equally capable of being employed by the present invention for fabricating the seal member 114. The seal member 114 envelopes a corresponding part 116 of the tapered portion 106 of the hollow body member 102 of the pipe plug 100, as illustrated in FIG. 1b. The seal member 114 is adapted to slide along the exterior surface of the tapered portion 106 of the hollow body member 102 in a direction generally orthogonal to the direction of the threads, such as to allow for using the pipe plug 100 with piping members of a variety of inner diameters (not shown in the drawing).

As will be appreciated by those skilled in the art, the interior surface of the seal member 114 is, preferably, lubricated to allow for sliding of the seal member 114 along the exterior surface of the tapered portion 106 of the hollow body member 102. A skilled artisan will further appreciate, that the seal member 114 is capable of expanding and contracting responsive to pressure subjected thereupon by the hollow body member 102 of the pipe plug 100 such as to conform to the inner dimensions of a corresponding piping member. Thus, the seal member 114 together with other components of the suitably provides a leak-safe seal for the pipe plug 100 of the subject application. Relative rotation of the tapered portion 106 and the seal member 114 in a first direction causes the seal member to stretch and expand radially outwardly for sealingly engaging the inner surface (not shown) of an associated pipe. The radially outward surface of the seal member may include features such as lips, rings, ridges or the like to help ensure a tight fluid connection between the plug and the associated pipe.

Figure 2:
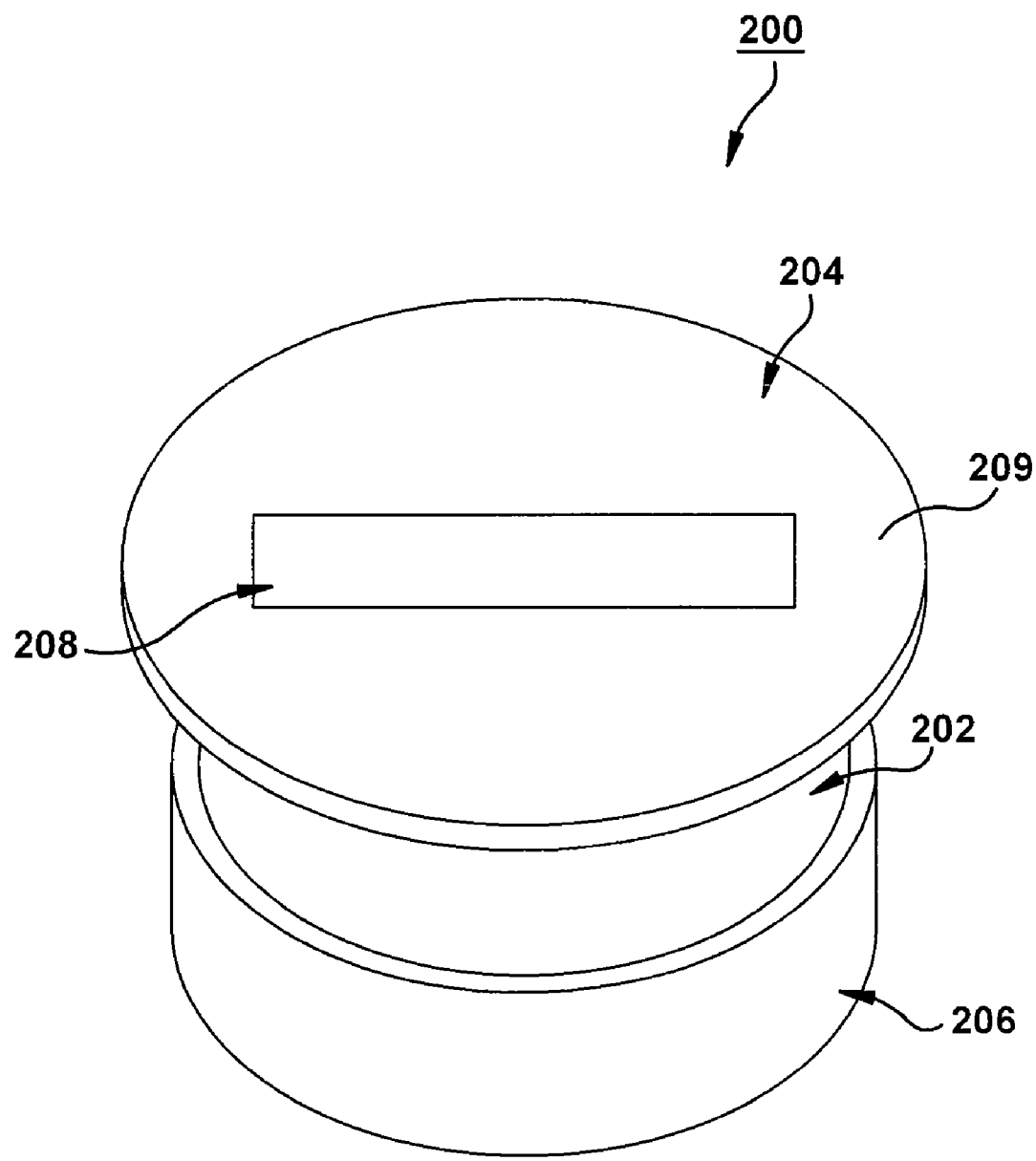
FIG. 2 illustrates an overall view of a cap portion of a pipe plug in accordance with one embodiment of the subject application.

Turning now to FIG. 2, there is shown an overall view of an end cap portion 200 of a pipe plug in accordance with one embodiment of the subject application. As shown in FIG. 2, the end cap portion 200 includes a solid cylindrical portion 202 and a disk portion 204, which are rigidly attached to each other. It will be apparent to those skilled in the art that the end cap portion 200 is capable of being fabricated from as a single component including the solid cylindrical portion 202 and a disk portion 204. The solid cylindrical portion 202 is adapted to be engaged with the cylindrical portion 206 of the hollow body of the pipe plug (not shown in the drawing). Thus, the relationship of the dimensions of the solid cylindrical portion 202 of the end cap portion 200 and of the inner diameter of the cylindrical portion 206 are such, as to allow for engaging the solid cylindrical portion 202 of the end cap portion 200 with the interior surface of the cylindrical portion 206 of the hollow body of the pipe plug. As illustrated in FIG. 2, the end cap portion 200 further includes a slot 208. The slot 208 is adapted for receiving a corresponding tightening appliance, such as a channel lock or crescent wrench, to provide engaging of the pipe plug with a corresponding pipe member (not shown in the drawing).

Figure 3A:
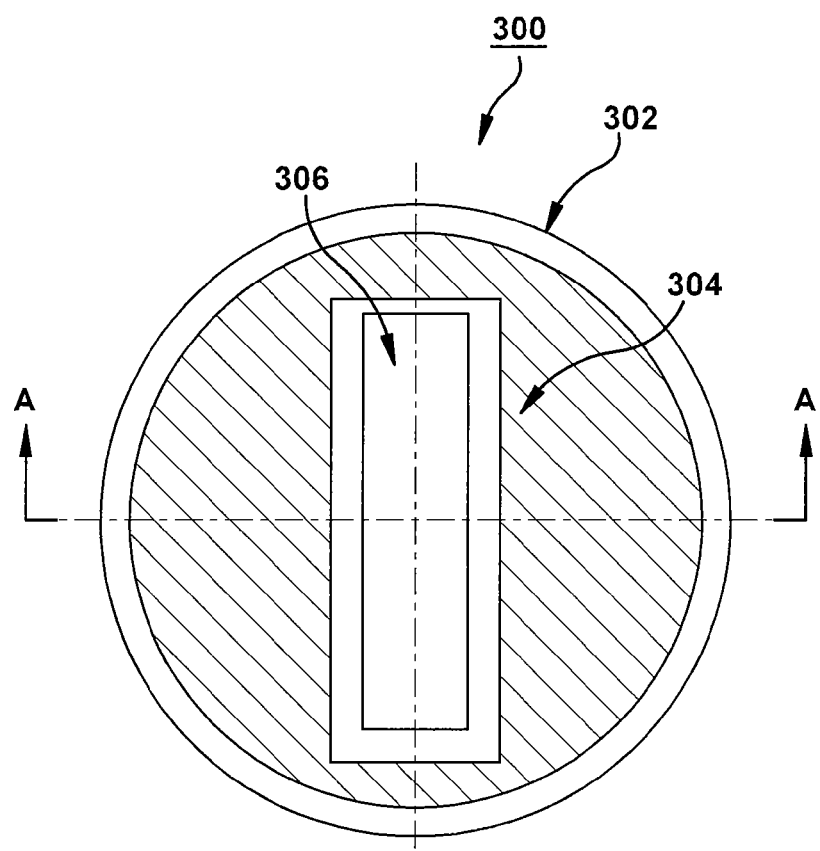
FIG. 3a illustrates a top view of a pipe plug in accordance with one embodiment of the subject application.

Referring now to FIG. 3a, there is shown a top view of a pipe plug 300 in accordance with one embodiment of the subject application. The pipe plug 300 includes an end cap portion 302 which includes a locating appliance, adapted for being located by a metal detector. In the embodiment of FIG. 3a, the locating appliance is made as a metal plate member 304. The metal plate member 304 is fixedly attached to an exterior surface of the end cap portion 302. Those skilled in the art will recognize that the metal plate member 304 is capable of being molded to the exterior surface of the end cap portion 302. Alternatively, the metal plate member 304 is capable of being embedded into the top surface of the end cap portion 302. As illustrated in FIG. 3a, the metal plate member 304 is of a disk shape. As will be recognized by those skilled in the art, the metal plate member 304 is suitably fabricated from any material capable of detection by a metal detector, such as for example and without limitation, bronze, steel, iron, brass, and the like.

It will further be appreciated by those skilled in the art that, preferably, the material of the metal plate member 304 is suitably protected from external exposure so as to prevent degradation to the metal plate member 304 from such exposure. Suitable materials, such as zinc and the like, and methods for protecting metal are well-known in the art, and any such material and method is capable of being employed to protect the exposed metal of the metal plate member 304. As will be apparent to those skilled in the art, when suitably employed, the pipe plug 300 enables a user, such as utility maintenance personnel, homeowners, and the like, to quickly and accurately locate covered sewer pipes and the like, without requiring large excavations, using any suitable metal detector known in the art. The end cap portion 300 of the pipe plug 300 further includes a slot 306. The slot 306 is adapted for receiving a corresponding tightening appliance, such as a channel lock or crescent wrench, to provide engaging of the pipe plug with a corresponding pipe member (not shown in the drawing).

Figure 3B:
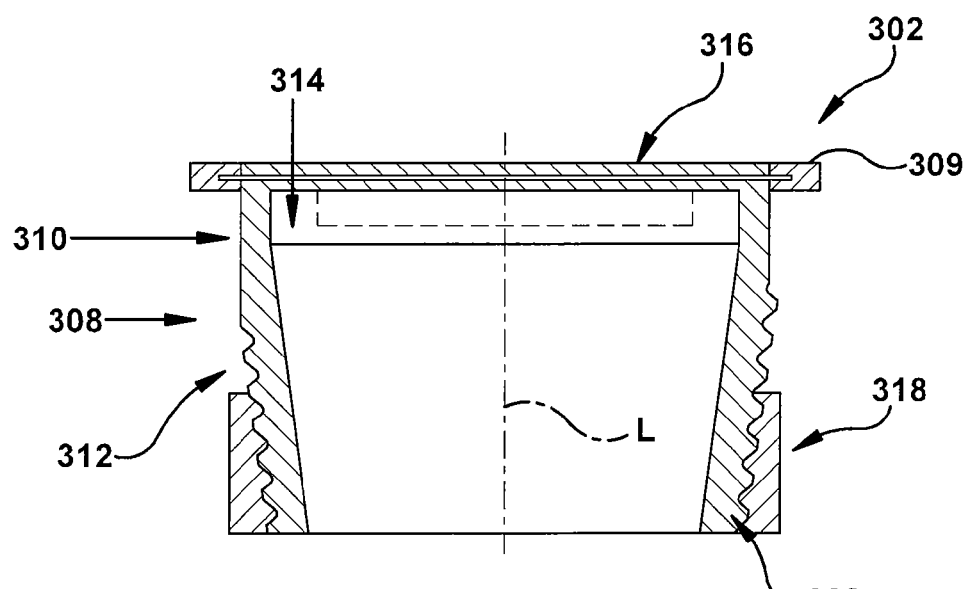
FIG. 3b illustrates a cross-sectional view of a pipe plug in accordance with one embodiment of the subject application.

Turning now to FIG. 3b, there is shown a cross-sectional view of the pipe plug 300 in accordance with one embodiment of the subject application. As shown in FIG. 3b, the pipe plug 300 includes a hollow body 308 adapted for being received by an associated piping member (not shown in the drawing). The hollow body 308 includes a cylindrical portion 310 and a tapered portion 312 rigidly attached to one end of the cylindrical portion 310. As shown in FIG. 3b, the other end of the cylindrical portion 304 of the hollow body 302 is engaged with the end cap portion 302 so as to prevent unwanted material, such as debris, from entering hollow body 302 and hence, from entering an associated piping member.

The a cylindrical portion 310 and a tapered portion 312 includes a solid cylindrical portion 314 and a disk portion 316, which are rigidly attached to each other. As will be appreciated by those skilled in the art, end cap portion 302 is capable of being suitably fabricated as a single component including the solid cylindrical portion 314 and the disk portion 316. The disk portion 316, as depicted in FIG. 3b, overlaps the solid cylindrical portion 314, and overlaps the cylindrical portion 304 of the hollow body 302. The solid cylindrical portion 310 is adapted to be engaged by the interior of the cylindrical portion 310 of the hollow body 308 of the pipe plug 300. Thus, the relationship of the dimensions of the solid cylindrical portion 314 of the end cap portion 302 and of the inner diameter of the cylindrical portion 310 of the hollow body 308 are such, as to allow for engaging the solid cylindrical portion 314 of the end cap portion 302 with the interior surface of the cylindrical portion 310 of the hollow body member 308 of the pipe plug 300.

In another embodiment, the hollow body member 308 of the plug member 300 is capable of being fabricated as a single component including end cap portion 302, the cylindrical portion 310, and the tapered portion 312, such as, a single tube closed at one end by the cap portion 302.

The pipe plug 300 further includes a seal member 318 shown in FIG. 3b. The seal member 318 is shaped as a hollow cylinder and is, preferably, made of a resilient material, such as a synthetic rubber, rubber-like plastics, natural rubber, and the like. Other suitable materials are equally capable of being employed by the present invention for fabricating the seal member 318. The seal member 318 envelopes a corresponding part 320 of the tapered portion 312 of the hollow body member 308 of the pipe plug 300, as illustrated in FIG. 3b. The seal member 318 is adapted to slide along the exterior surface of the tapered portion 312 of the hollow body member 308. As will be appreciated by those skilled in the art, the interior surface of the seal member 318 is, preferably, lubricated to allow for sliding of the seal member 318 along the exterior surface of the tapered portion 312 of the hollow body member 308. A skilled artisan will further appreciate, that the seal member 318 is capable of expanding and contracting responsive to pressure subjected thereupon by the hollow body member 308 of the pipe plug 300 such as to conform to the inner dimensions of a corresponding piping member, and form thereupon a leak-safe seal.

As will be further recognized by those skilled in the art, the tapered portion 106 of the pipe plug 100 of FIG. 1a, as well as the tapered portion 312 of the pipe plug 300 shown in FIG. 3b, is tapered such as to suitably fit inside a variety of inner diameters of associated piping members. As will be understood by those skilled in the art, an associated piping member is any suitable pipe as is known in the art, such as pipes used in various plumbing and piping pressurized and non-pressure applications typically ranged from ½" to 6". Suitable pipes with other suitable dimensions are capable of being used without departing from the scope of the subject application. In one embodiment, the same pipe plug is capable of being used with pipes having an inner diameter of 4" and with pipes having an inner diameter of 6".

A skilled artisan will further appreciate that the pipe plug of the subject application is capable of being used with pipes having a variety of schedule numbers, such as, for example but without limitation, SCH 28, SCH 35, SCH 38, and SCH 40. Those skilled in the art will understand, that suitable materials of associated pipes include, but are not limited to aluminum, brass, bronze, carbon or graphite, ceramic or ceramic lined, clay or vitrified clay, concrete, polyvinyl chloride (PVC), thermoplastic resin, such as acrylonitrile-butadiene-styrene (ABS), and the like. It will be further understood by those skilled in the art that hollow body member of the pipe plug in accordance with subject application, is capable of being constructed of any suitable material known in the art, such as PVC, ceramic, and the like.

In operation, with reference to FIGS. 1a and 1b, an associated piping member is first cut at any desired grade, or at the ground level. Next, the pipe plug, 100 is first installed and turned clockwise. As the pipe plug 100 is turned, depending on the relationship between the outer dimensions of the hollow body member 102 and the inner dimensions of the associated piping member, the seal member 114 moves along the exterior surface of the tapered member member 102 in a direction generally orthogonal to the direction of the thread members, such that the pipe plug 100 is engaged with the interior of the associated piping member having a tight fit inside the pipe member. Once the pipe plug 100 is engaged with the interior of the piping member, a respective tightening appliance, such as a channel lock or crescent wrench, is used for further fixing the pipe plug 100 in the interior of the associated piping member. The seal member 114 expands to the inner dimensions of the associated piping member thus providing, together with the other components of the pipe plug 100 of the subject application, a water tight seal.

As will be recognized by those skilled in art, the pipe plug as illustrated in FIGS. 2, 3a, and 3b, is installed similarly to that as described with respect to the pipe plug illustrated in FIG. 1a and FIG. 1b. Once the pipe plug 300 is installed, at some point in the future, when an associated user has a need or desire to access the pipe, such as for replacement purposes, to clear a sewer line, or the like, the associated user is able to quickly and accurately locate the pipe plug 300, using any suitable metal detector or device known in the art capable of detecting metallic objects.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A pipe plug system comprising:
a non-conductive main body member including a substantially cylindrical portion and a tapered portion on an end of the cylindrical portion, the tapered portion defining a radially outwardly directed engagement surface;
an end cap portion on an end of the cylindrical portion opposite from the tapered portion adapted to be matingly engaged oriented in an associated, recessed pipe such that the end cap portion is positioned as at least one of a drain, vent, cleanout, fluid or sewer pipe, or their combination;
an annular flexible seal member defining an inner hole configured to receive the tapered portion of the main body member, a radially inwardly directed surface configured to slidably engage the radially outwardly directed engagement surface of the tapered portion of the main body member, and a substantially cylindrical outwardly directed surface configured to sealingly engage a substantially cylindrical inner surface of the associated, recessed pipe; and,
a conductive, planar locating appliance connected with at least one of the main body member, the seal member, or their combination, the locating appliance being encased in a protective medium, the plane of the locating appliance being oriented radially outwardly relative to the cylindrical portion so as to maximize exposure to an associated conductive material detector when exposed to a signal emanating therefrom when the end cap portion is matingly engaged with the associated, recessed tubing.

2. The pipe plug system according to claim 1 wherein: the protective medium is comprised of the end cap portion.

3. The pipe plug system according to claim 2 wherein the locating appliance is a metal disc attached with the end cap portion.

4. The pipe plug system according to claim 3 wherein the locating appliance is a metal disc embedded within the end cap portion.

5. The pipe plug system according to claim 1 wherein:
the tapered portion includes a first set of threads on the radially outwardly directed engagement surface thereof; and,
the annular seal member includes a second set of threads on the radially inwardly directed surface thereof, the first and second sets of threads being configured to slidably mutually engage whereby relative motion between the main body member and the seal member in a first direction causes the seal member to expand radially outwardly for engagement with the inner surface of the associated pipe, and whereby relative motion between the main body member and the seal member in a second direction opposite the first direction causes the seal member to contract radially inwardly for disengagement with the inner surface of the associated pipe.

6. The pipe plug system according to claim 1 wherein the end cap portion includes an outer edge extending radially outwardly from the cylindrical portion of the main body member to define a circular lip on the end cap portion, the lip being configured to selectively abut a circular end of the associated pipe.

7. The pipe plug system according to claim 1 wherein:
the end cap portion defines a shape for engagement with an associated tool for servicing the pipe plug system relative to the associated pipe.

8. The pipe plug system according to claim 7 wherein:
the end cap portion defines a slot shape for engagement with an associated tool for servicing the pipe plug system relative to the associated pipe; and,
the locating appliance defines a slot shape circumscribing the slot shape of the end cap portion.

9. The pipe plug system according to claim 1 wherein the seal member is formed of a rubberized material.

10. The pipe plug system according to claim 1 wherein the locating appliance is formed of metal and includes an outer coating configured to protect the metal from corrosion.

11. The pipe plug system according to claim 1 wherein the end cap portion is formed integrally with the main body member.

* * * * *